US008563939B2

(12) United States Patent
Okada et al.

(10) Patent No.: US 8,563,939 B2
(45) Date of Patent: Oct. 22, 2013

(54) RADIATION DETECTING APPARATUS AND RADIATION DETECTING SYSTEM

(75) Inventors: Satoshi Okada, Tokyo (JP); Masato Inoue, Kumagaya (JP); Kazumi Nagano, Fujisawa (JP); Shinichi Takeda, Honjo (JP); Satoru Sawada, Kodama-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/988,803

(22) PCT Filed: May 29, 2009

(86) PCT No.: PCT/JP2009/060296
§ 371 (c)(1),
(2), (4) Date: Oct. 20, 2010

(87) PCT Pub. No.: WO2009/148143
PCT Pub. Date: Dec. 10, 2009

(65) Prior Publication Data
US 2011/0038111 A1 Feb. 17, 2011

(30) Foreign Application Priority Data

Jun. 2, 2008 (JP) ................................. 2008-144448

(51) Int. Cl.
H01L 27/146 (2006.01)
H05K 5/00 (2006.01)
(52) U.S. Cl.
USPC ................................. 250/370.09; 361/679.01
(58) Field of Classification Search
USPC ............. 250/370.09, 370.1, 580; 361/679.01
See application file for complete search history.

(56) References Cited

U.S. PATENT DOCUMENTS

| 6,600,157 B2 | 7/2003 | Watanabe |
| 6,608,312 B1 | 8/2003 | Okada |
| 6,940,078 B2 | 9/2005 | Yasuda et al. |
| 7,183,556 B2 | 2/2007 | Yagi |
| 7,514,703 B2 | 4/2009 | Iwakiri |

(Continued)

FOREIGN PATENT DOCUMENTS

| JP | 2004-361879 A | 12/2004 |
| JP | 2005-3755 | 1/2005 |

(Continued)

OTHER PUBLICATIONS

PCT International Search Report and Written Opinion of the International Searching Authority, International Application No. PCT/JP2009/060296, Mailing Date Sep. 30, 2009.

Primary Examiner — David Porta
Assistant Examiner — Faye Boosalis
(74) Attorney, Agent, or Firm — Fitzpatrick, Cella, Harper and Scinto

(57) ABSTRACT

A radiation detecting apparatus includes: a sensor panel for converting radiation or light into an electric charge; a casing holding the sensor panel; an acceleration detecting unit for detecting an acceleration relating to a movement of the radiation detecting apparatus, and for transmitting a signal based on a value of the acceleration; a determining unit for determining, based on the signal transmitted from the acceleration detecting unit, as to whether the radiation detecting apparatus is in an excessively accelerated state, a free falling state or a normal state; and a buffer unit for operating to absorb a shock exerted on the radiation detecting apparatus, responsive to determination by the determining unit such that the radiation detecting apparatus is in an excessively accelerated state or a free falling state. The buffer unit is arranged outside of the casing.

19 Claims, 7 Drawing Sheets

(56) References Cited

U.S. PATENT DOCUMENTS

| | | |
|---|---|---|
| 7,548,168 B2 | 6/2009 | Ishikawa et al. |
| 2006/0212986 A1 | 9/2006 | Mahoney |
| 2007/0085015 A1 | 4/2007 | Castleberry |

FOREIGN PATENT DOCUMENTS

| | | |
|---|---|---|
| JP | 2005-3755 A | 1/2005 |
| JP | 2005-6806 | 1/2005 |
| JP | 2006-113053 | 4/2006 |
| JP | 2006-251196 | 9/2006 |
| WO | 2008/054717 A2 | 5/2008 |

RADIATION DETECTING APPARATUS AND RADIATION DETECTING SYSTEM

TECHNICAL FIELD

The present invention relates to a radiation detecting apparatus and a radiation detecting system.

BACKGROUND ART

Various types of digitized radiation detecting apparatuses and radiation detecting systems have been proposed and in practical use. Particularly, a compact and portable cassette type radiation detecting apparatus can be used in various scenes because of easy handling and carrying.

However, the cassette type radiation detecting apparatus uses a sensor panel of glass for detecting incident radiation and may break due to a shock such as falling. Thus, there is a need for a radiation detecting apparatus resistant to shock and with high safety. To solve the above problem, various cassette type radiation detecting apparatuses have been studied and developed.

For example, U.S. Patent Application Publication No. 2004/0252613 (corresponding to Japanese Patent Application Laid-Open No. 2005-003755) proposes an image information detecting cassette that stops supply of electric power when the image information detecting cassette falls and breaks due to a shock to increase safety of an operator.

U.S. Patent Application Publication No. 2005/0017188 (corresponding to Japanese Patent Application Laid-Open No. 2004-361879) proposes a radiation detecting cassette in which a casing holding a solid-state radiation detector is constituted by an outer shell, an inner shell, and a restraining member for restraining a movement of the inner shell with respect to the outer shell to increase resistance to shock.

DISCLOSURE OF THE INVENTION

However, the radiation detecting apparatus described in U.S. Patent Application Publication No. 2004/0252613 (corresponding to Japanese Patent Application Laid-Open No. 2005-003755) can detect breakage of the radiation detecting apparatus, but cannot reduce the possibility of breakage at a time of falling of the radiation detecting apparatus. The radiation detecting apparatus described in U.S. Patent Application Publication No. 2005/0017188 (corresponding to Japanese Patent Application Laid-Open No. 2004-361879) includes the outer shell, the inner shell, and a shock absorber provided between the outer shell and the inner shell, and this inevitably increases the size of the radiation detecting apparatus.

In view of the above problems, the present invention has an object to provide a radiation detecting apparatus that can prevent an increase in the size of the radiation detecting apparatus, and can reduce the possibility of breakage when a shock such as falling is exerted on the radiation detecting apparatus.

A first aspect of the present invention relates to a radiation detecting apparatus comprising:

a sensor panel for converting radiation of light into an electric charge;

a casing holding the sensor panel;

an acceleration detecting unit for detecting an acceleration relating to a movement of the radiation detecting, and for transmitting a signal based on a value of the acceleration;

a determining unit for determining, based on a comparing, with a reference value, the signal transmitted from the acceleration detecting unit, as to whether the radiation detecting apparatus is in a normal state or not;

a buffer unit, arranged out side of the casing, for operating to absorb a shock exerted on the radiation detecting apparatus, responsive to determination by the determining unit such that the signal transmitted from the acceleration detecting unit exceeds the reference value.

A second aspect of the present invention relates to a radiation detecting system including at least: a radiation detecting apparatus; a signal processing unit for processing a signal derived from the radiation detecting apparatus; and a radiation source generating the radiation.

According to the present invention, it is possible to suppress an undesirable increasing a size of the radiation detecting apparatus, and to reduce a risk of damaging the radiation detecting apparatus due to a shock at a time of a falling the radiation detecting apparatus.

Other features and advantages of the present invention will be apparent from the following description taken in conjunction with the accompanying drawings, in which like reference characters designate the same or similar parts throughout the figures thereof.

BEST MODES FOR CARRYING OUT THE INVENTION

Now, an embodiment of a radiation detecting apparatus according to the present invention will be described in detail with reference to the drawings.

Figure 1:
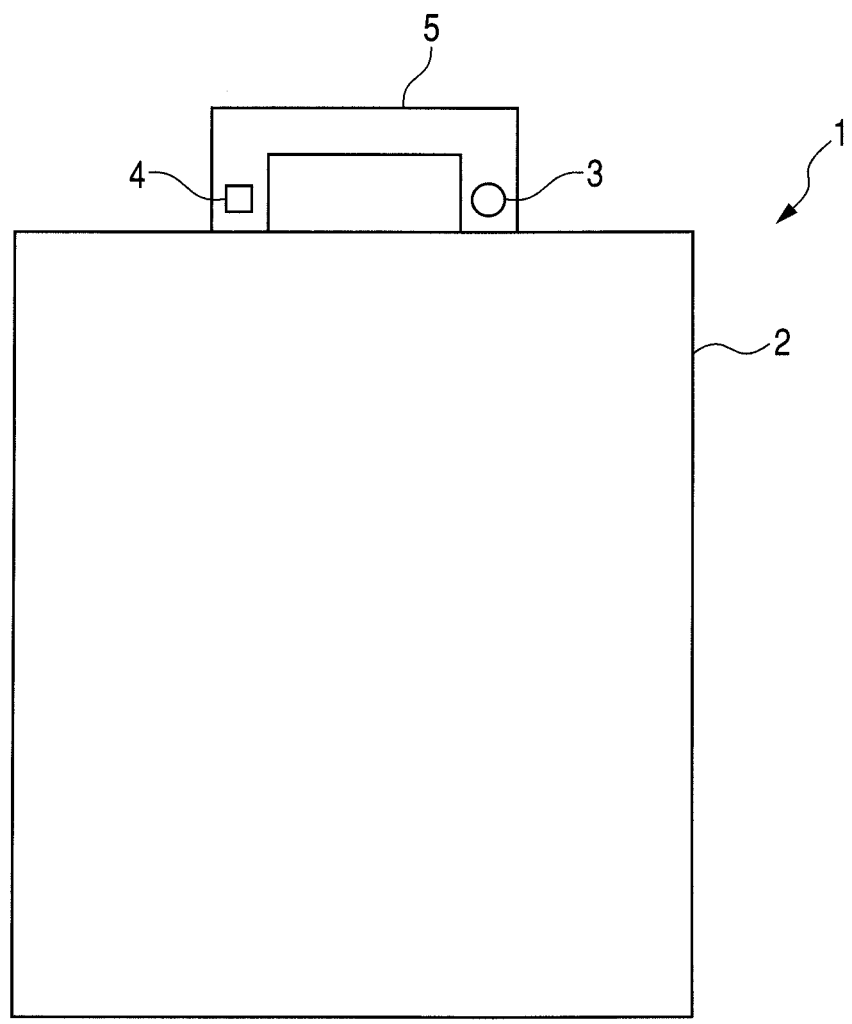
FIG. 1 is an appearance view of an embodiment of a radiation detecting apparatus according to the present invention.
Figure 2:
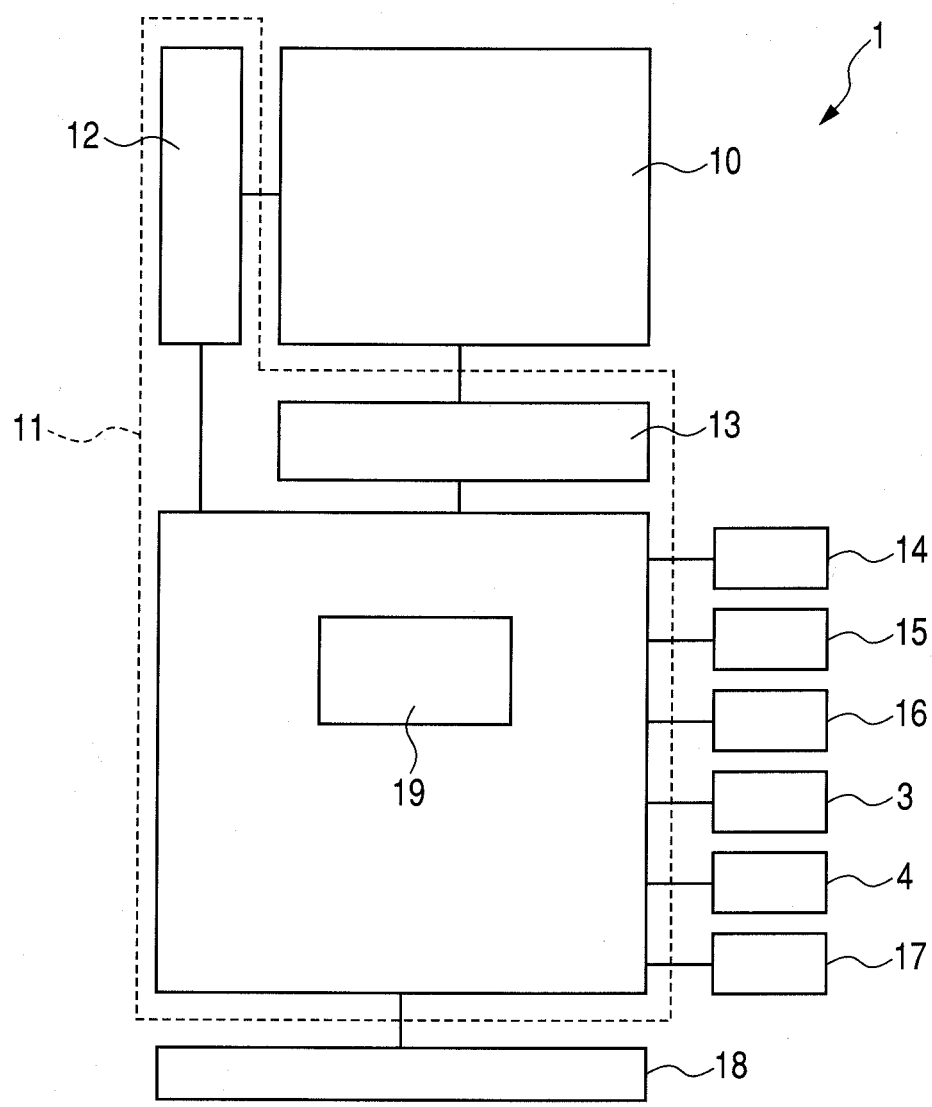
FIG. 2 is a circuit block diagram of the embodiment of the radiation detecting apparatus according to the present invention.

FIG. 1 is an appearance view of an embodiment of a radiation detecting apparatus according to the present invention. FIG. 2 is a circuit block diagram of the embodiment of the radiation detecting apparatus according to the present invention.

The radiation detecting apparatus 1 of the embodiment includes a casing 2 having a handle 5. The casing 2 includes at least a sensor panel 10, a control circuit portion 11, and a battery 18 for supplying electric power to the control circuit portion 11. The control circuit portion 11 includes a drive circuit 12 of the sensor panel 10, a read out circuit 13 of a signal derived from the sensor panel 10, and a control portion connected to the drive circuit 12 and the read out circuit 13.

Further, the control circuit portion 11 includes a determining unit 19 for determining a state of the radiation detecting apparatus 1. Specifically, the determining unit 19 determines, based on a signal transmitted from an acceleration detecting unit described later, whether the radiation detecting apparatus 1 in moving is in an excessively accelerated state, a free falling state or a normal state. The determining unit 19 includes a circuit such as a comparator. The comparator compares a preset signal with a signal transmitted by an acceleration detecting means, and outputs a different value by a result of the comparing.

Further, to the control circuit portion 11, an acceleration detecting unit (acceleration sensor 14), a memory 15, and a buffer unit 16 for operating according to a signal from the determining unit 19 are connected. The acceleration sensor 14 has a function of detecting an acceleration relating to the movement of the radiation detecting apparatus 1, and transmitting a signal based on a value of the acceleration to the determining unit 19. The memory 15 stores a value of a criterion used when the determining unit 19 determines the state of the radiation detecting apparatus 1, and the determining unit 19 compares the criterion value with the obtained value of the acceleration for determination. The buffer unit 16 is a member for protecting the radiation apparatus 1 from a shock such as falling. The buffer unit 16 will be described later in more detail.

Further, to the control circuit portion 11, a state display unit 3 for displaying that the buffer unit 16 operates according to the signal from the determining unit 19, and a holding switch 4 for holding the operating buffer unit 16 in the radiation detecting apparatus 1 are connected. The state display unit 3 and the holding switch 4 can be provided, for example, on the handle 5 as in FIG. 1 so as to be externally checked and operated. As the state display unit 3, an LED or a liquid crystal display apparatus can be used. Further, to the control circuit portion 11, a communication unit 17 for transmitting and receiving data to and from an external device is connected. As the communication unit 17, an external connection terminal is placed in the casing 2 with wires, and a transmitting and receiving circuit including an antenna is placed in the casing 2 without wires.

The battery 18 supplies electric power to the control circuit portion 11 and the components connected to the control circuit portion 11.

As the sensor panel 10, an indirect conversion type sensor panel can be used in which a plurality of pixels having photoelectric conversion elements and TFTs is placed on a glass substrate, and that detects light converted from radiation into visible light by a scintillator. Alternatively, a direct conversion type sensor panel can be used in which a TFT array is placed on a glass substrate, and that coverts radiation into an electric charge with a-Se of the TFT array. The radiation refers to X-ray, α-ray, β-ray, and γ-ray.

As the acceleration detecting unit (acceleration sensor 14), a general MEMS acceleration sensor of a piezoresistance type, capacitance type, or heat detection type can be used.

The buffer unit 16 is provided on an outer surface of the casing 2 of the radiation detecting apparatus 1, and is a member for expanding outward to absorb a shock. An example is an air bag. Another example is a buffer unit including a surface member that first comes into contact with a floor at a time of falling, and an elastic member such as an oil or gas pressure or a spring for lessening a shock. The surface member can be formed from plastic or metal, and desirably formed from light and strong CFRP or KFRP. The surface member can be also formed from a sheet shaped stretch material of synthetic fiber such as nylon, aramid and polyurethane. The elastic member is used for further lessening a shock at a time of falling, and selected from a shock absorber using a gas or oil pressure, an air bag, a rubber, a coil spring, and a plate spring.

When the buffer unit 16 is placed on a radiation incident side of the radiation detecting apparatus 1, the buffer unit 16 can be adjusted in its material and thickness so as to easily transmit radiation. For example, a surface member formed from aluminum having a thickness of 100 μm transmits 90% of X-ray of 50 keV. The transmittance of the X-ray is calculated by the following expression.

$$I\text{-}Io = \exp(-\mu T)$$

(where I is intensity of X-ray incident on a test specimen, Io is intensity of the X-ray after passing through the test specimen, μ is an absorption coefficient, and T is a thickness of the test specimen.)

The buffer unit can be formed from a material with little effect on an image such as an artifact. For example, the buffer unit can be formed from CFRP, KFRP, and a sheet shaped stretch material of synthetic fiber such as nylon, aramid and polyurethane. Further, the buffer unit can have a structure with small surface distribution such as a uniform thickness.

Next, a flow of operations of the above described components of the radiation detecting apparatus will be described.

Figure 3:
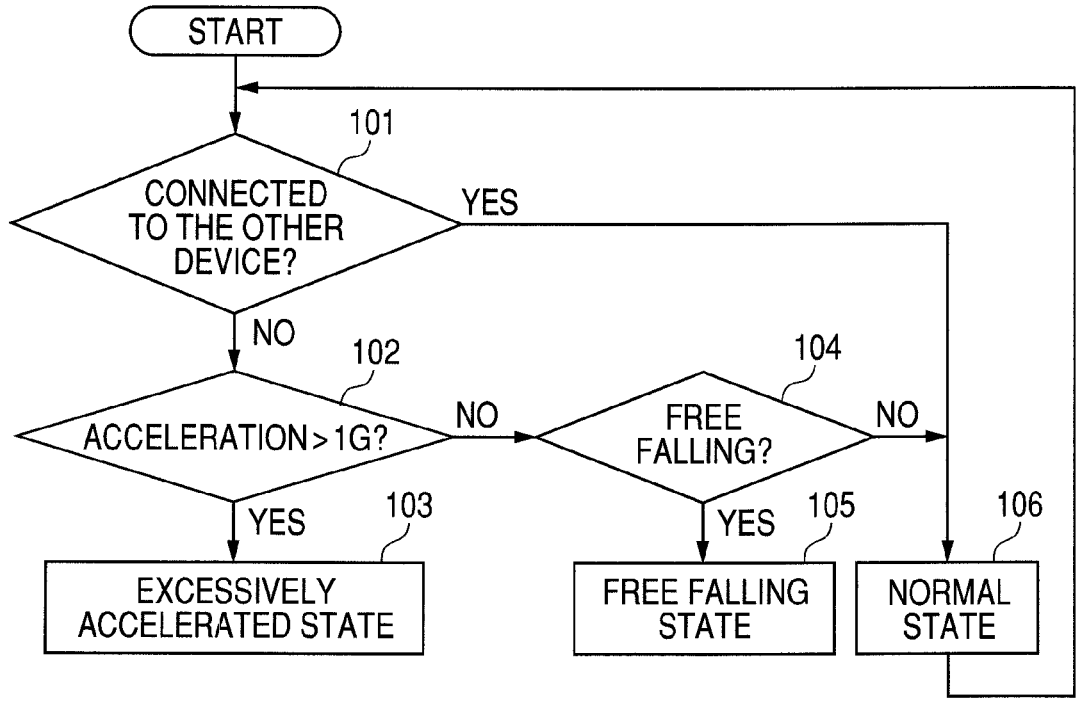
FIG. 3 is a flowchart illustrating an operation of the radiation detecting apparatus in FIGS. 1 and 2.

FIG. 3 is a flowchart illustrating an operation of the radiation detecting apparatus in FIGS. 1 and 2.

First, in Step 101, it is determined whether the radiation detecting apparatus 1 is connected (mounted) to the other device such as a C arm or a frame for an standing or recumbent position. The C arm is an apparatus having a C-shaped rotatable holder mainly for radiographing of X-ray moving images, and an X-ray source is fixed to one end of the C-shaped holder and the detecting apparatus is fixed to the other end. The determining unit 19 in the control circuit portion 11 determines the connection via the communication unit 17 in the radiation detecting apparatus, for example, from a signal transmitted from an external PC and indicating a connection state. With such connection, the radiation detecting apparatus 1 has a low possibility of breakage due to falling, and thus it is determined that the radiation detecting apparatus 1 is in a preset normal state, and the process proceeds to Step 106. Without the connection, the process proceeds to Step 102.

In Step 102, it is determined whether the radiation detecting apparatus 1 is in an excessively accelerated state. The determining unit 19 determines whether a value of an acceleration of the radiation detecting apparatus 1 obtained from the acceleration detecting unit (acceleration sensor 14) is in an excessively accelerated state (state with an acceleration higher than 1 G). When a signal higher than 1 G is input to the determining unit 19, the determining unit 19 determines that the value is in the excessively accelerated state, the process proceeds to Step 103, and the buffer unit 16 operates. When the acceleration is 1 G or lower, the process proceeds to Step 104.

In Step 104, it is determined whether the radiation detecting apparatus 1 is in a free falling state. Whether the radiation detecting apparatus 1 is in the free falling state is determined based on a gravity acceleration and a time thereof. For example, a case where a microgravity state lasts for 0.26 seconds is regarded as free falling. This is because when a falling height of the radiation detecting apparatus 1 provided on a bed in a recumbent position is about 35 cm, a falling time of the radiation detecting apparatus 1 is 0.27 seconds. In this case, the determining unit 19 determines that the radiation detecting apparatus 1 is in the free falling state when the microgravity state lasts for 0.26, the process proceeds to Step 105, and the buffer unit 16 operates. Otherwise, it is determined that the radiation detecting apparatus 1 is in the normal state, and the process proceeds to Step 106 described above and then returns to Step 101. The values of the criterion height and falling time are not limited to the above described values but can be selected by a user because a placement position of the radiation detecting apparatus may differ according to the state of use of the apparatus.

The values for determination criteria in Steps 102 and 104 are stored in a memory of the determining unit 19 itself, or used by the determining unit 19 reading data stored in the memory 15 connected to the control circuit portion 11.

When it is determined by the above described determination flow that the radiation detecting apparatus 1 is in the excessively accelerated state or the free falling state, the control circuit portion 11 sends a signal for operating the buffer unit 16. Thus, the buffer unit 16 operates so as to protect the radiation apparatus 1. When it is determined by the above described determination flow that the radiation detecting apparatus 1 is in the normal state, the control circuit portion 11 does not send a signal to the buffer unit 16.

Next, various embodiments of the buffer unit 16 will be described in detail.

Figure 4A:
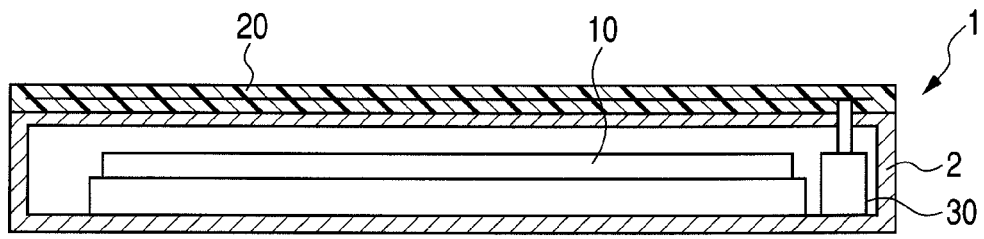
FIGS. 4A and 4B are schematic views of a radiation detecting apparatus using an air bag as a buffer unit.
Figure 4B:
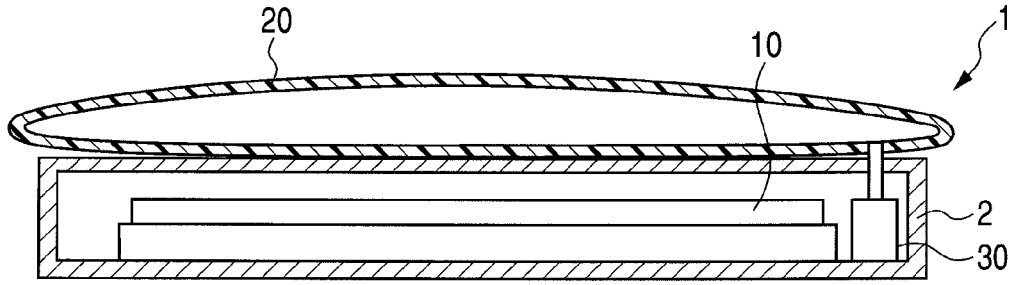

FIGS. 4A and 4B illustrate a radiation detecting apparatus including an air bag module as a buffer unit. The air bag module includes an air bag 20 and an inflator 30. The inflator 30 provides a gas into the air bag 20, and the air bag 20 is inflated by the gas provided by the inflator 30. FIG. 4A illustrates the radiation detecting apparatus in a normal state. When it is determined that the radiation detecting apparatus is in an excessively accelerated state or a free falling state, the control circuit portion sends a signal to the air bag module as the buffer unit, the inflator 30 provides a gas into the air bag 20 to inflate the air bag 20 as illustrated in FIG. 4B to absorb a shock. FIGS. 4A and 4B illustrate an example where the air bag 20 is placed on one surface of the radiation detecting apparatus, but providing air bags 20 on all surfaces increases safety. An air bag 20 inflated so as to have a thickness larger than a thickness of the apparatus can be desirably provided at a corner of the radiation detecting apparatus in FIG. 1 because of little effect on radiation use efficiency and images.

Figure 5A:
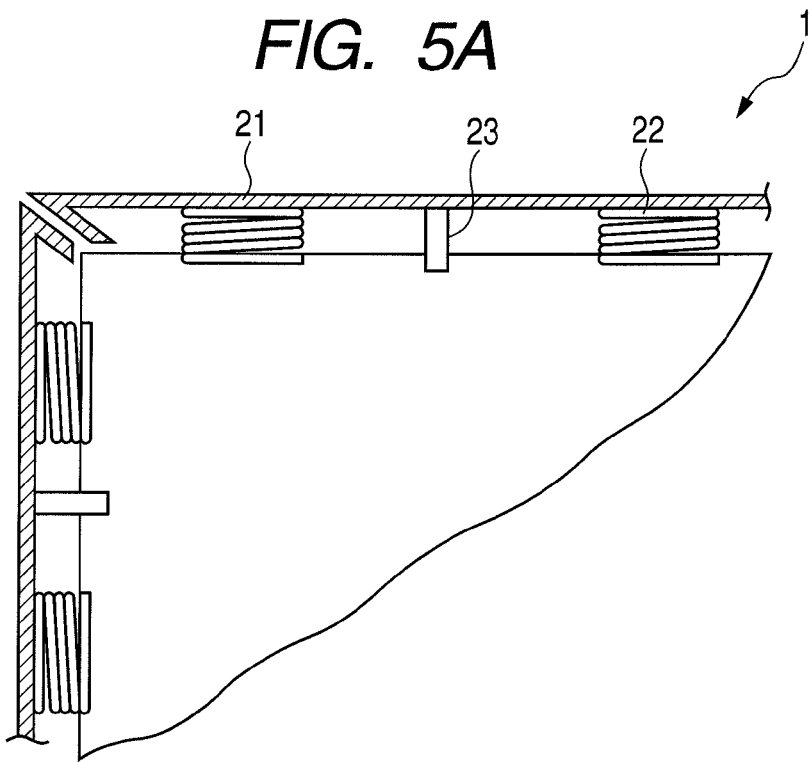
FIGS. 5A and 5B are schematic views of a radiation detecting apparatus using, as a buffer unit, a surface member formed from CFRP and a coil spring.
Figure 5B:
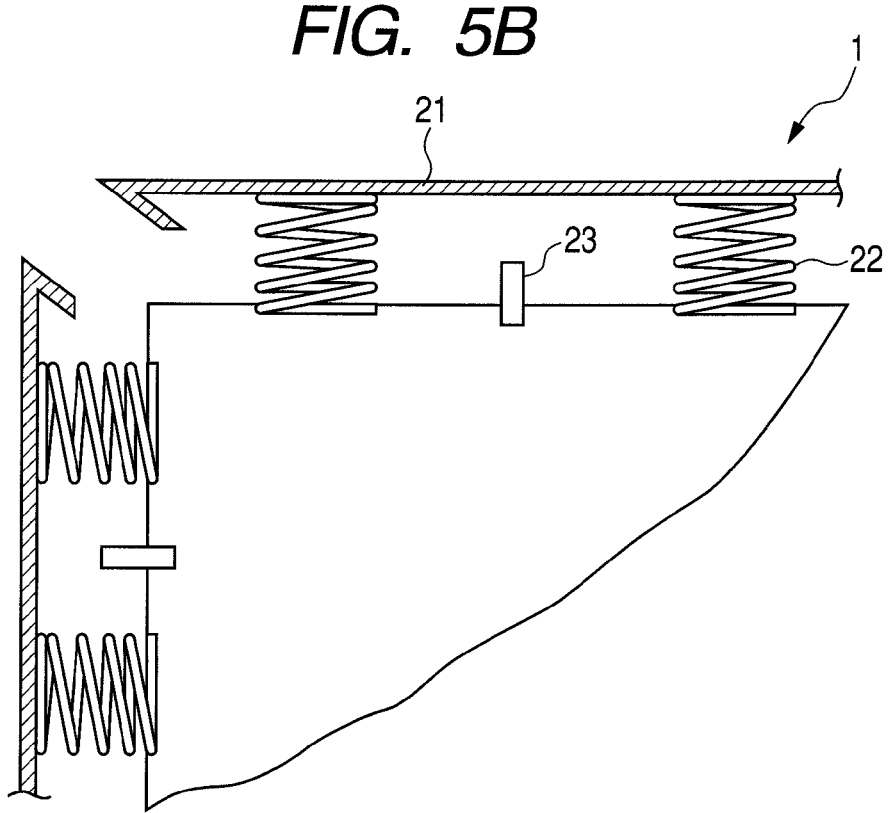

FIGS. 5A and 5B illustrate a radiation detecting apparatus using, as a buffer unit, a surface member 21 formed from CFRP (carbon fiber reinforced plastic) and an elastic member formed of a coil spring 22. FIG. 5A illustrates a corner of the radiation detecting apparatus in a normal state with a metal spring being contracted and fixed by a fixing unit 23. As the fixing unit 23, a mechanical unit such as a hook combined with a cam or a magnetic unit such as a magnet is used. An electromagnetic unit such as a solenoid for holding with an attracting force of a permanent magnet can be used, and the solenoid when used can also serve as an elastic member. When it is determined whether the radiation detecting apparatus is in an excessively accelerated state or a free falling state, the control circuit portion sends a signal to the buffer unit, the fixing unit is opened as in FIG. 5B, and the coil spring 22 extends to absorb a shock.

Figure 6A:
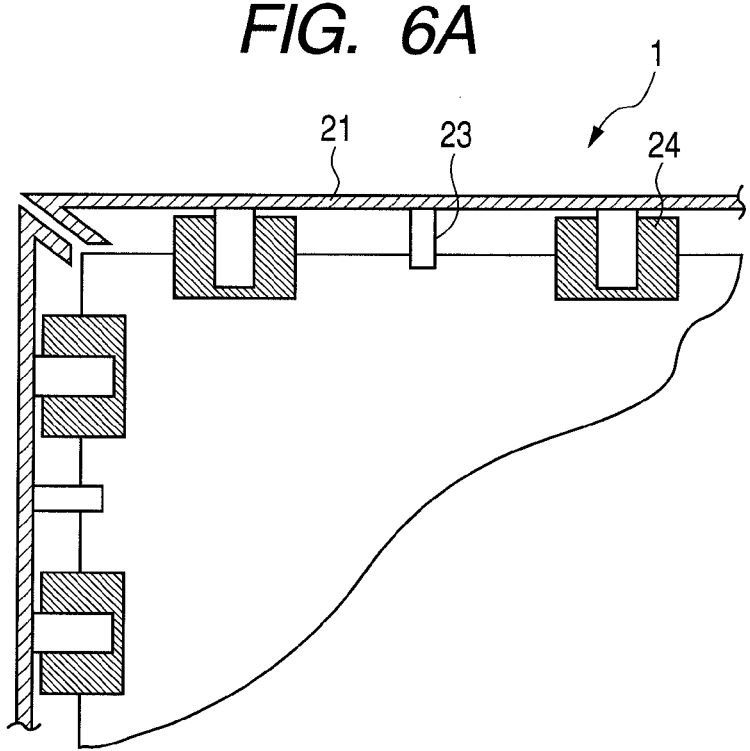
FIGS. 6A and 6B are schematic views of a radiation detecting apparatus using, as a buffer unit, a surface member formed from CFRP and a shock absorber using a gas pressure.
Figure 6B:
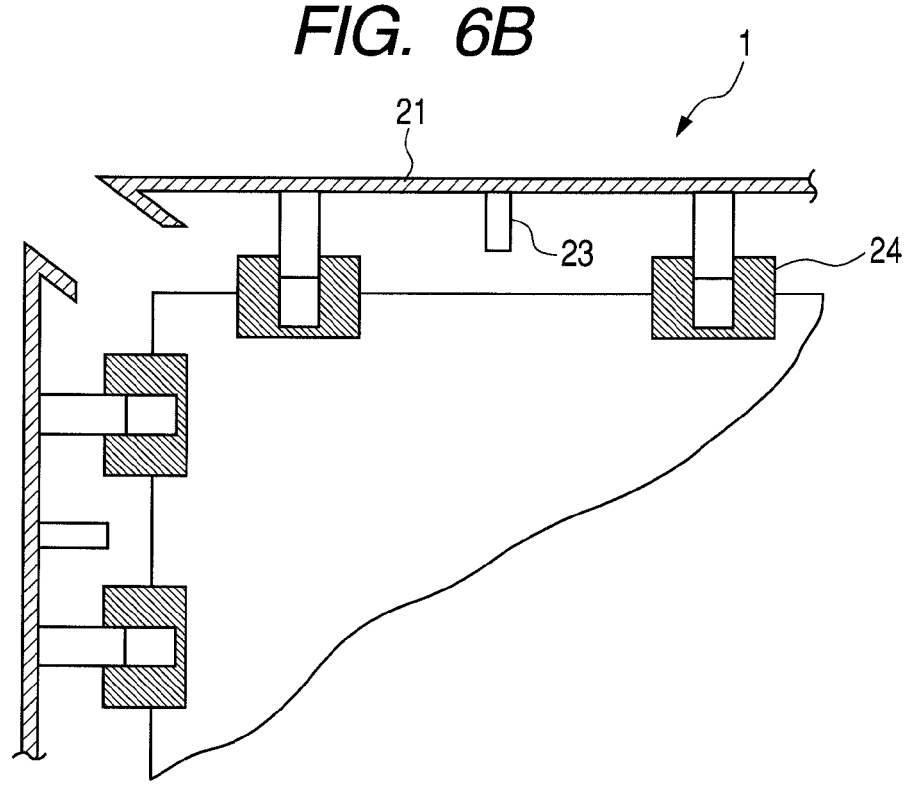

FIGS. 6A and 6B illustrate a radiation detecting apparatus using, as a buffer unit, a surface member 21 formed from CFRP and an elastic member formed of a shock absorber 24 using a gas pressure. FIG. 6A illustrates a corner of the radiation detecting apparatus in a normal state with the gas pressure being reduced and the shock absorber 24 being contracted and fixed by a fixing unit 23. When it is determined that the radiation detecting apparatus is in an excessively accelerated state or a free falling state, the control circuit portion sends a signal to the buffer unit, the fixing unit is opened as illustrated in FIG. 6B, and the gas pressure is applied to the shock absorber to absorb a shock at a time of falling.

Figure 7A:
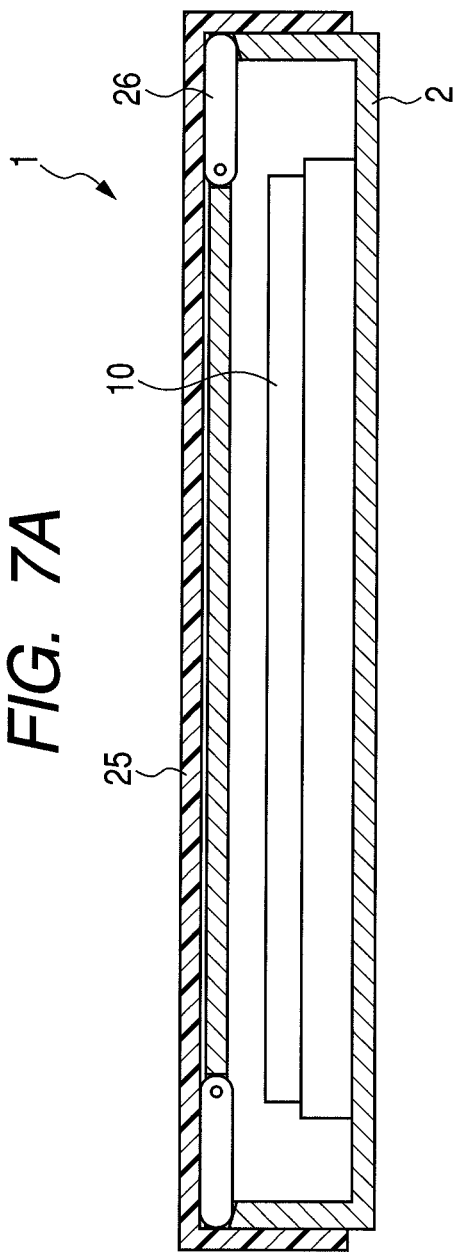
FIGS. 7A and 7B are schematic views of a radiation detecting apparatus using, as a buffer unit, a surface member formed from sheet shaped polyurethane fiber and a plate spring.
Figure 7B:
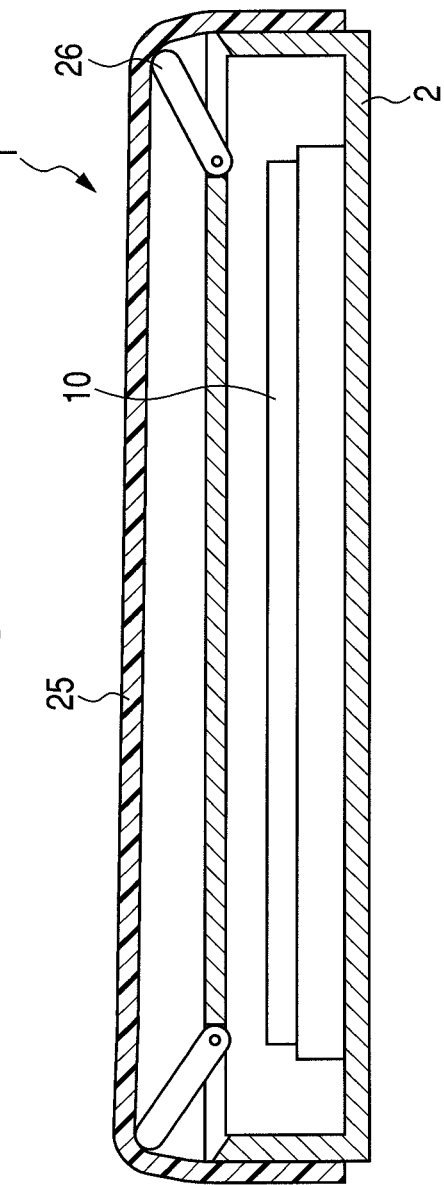

FIGS. 7A and 7B illustrate a radiation detecting apparatus using, as a buffer unit, a surface member 25 formed from sheet shaped polyurethane fiber and an elastic member formed of a plate spring 26. FIG. 6A illustrates a cross section of the radiation detecting apparatus in a normal state with the plate spring 26 being deformed and fixed by a fixing unit (not shown). When it is determined that the radiation detecting apparatus is in an excessively accelerated state or a free falling state, the control circuit portion sends a signal to the buffer unit, the fixing unit is opened as illustrated in FIG. 7B, and the plate spring 26 expands the surface member 25 formed from the sheet shaped polyurethane fiber to absorb a shock.

In any of the radiation detecting apparatuses in FIGS. 4A to 7B, the buffer unit can be provided in any portions beside the corner and the radiation incident side of the radiation detecting apparatus.

With a mechanism for automatically restoring the operated buffer unit, the buffer unit can be restored in conjunction with the holding switch 4 in FIG. 1. For example, using a solenoid as a lock mechanism allows the buffer unit to be restored by controlling a current flowing through a coil of the solenoid. The present invention is not limited to the detailed examples in FIGS. 4A to 7B, and configurations can be combined that can prevent an increase in the size of the radiation detecting apparatus and reduce the possibility of breakage when a shock such as falling is exerted on the radiation detecting apparatus.

Figure 8:
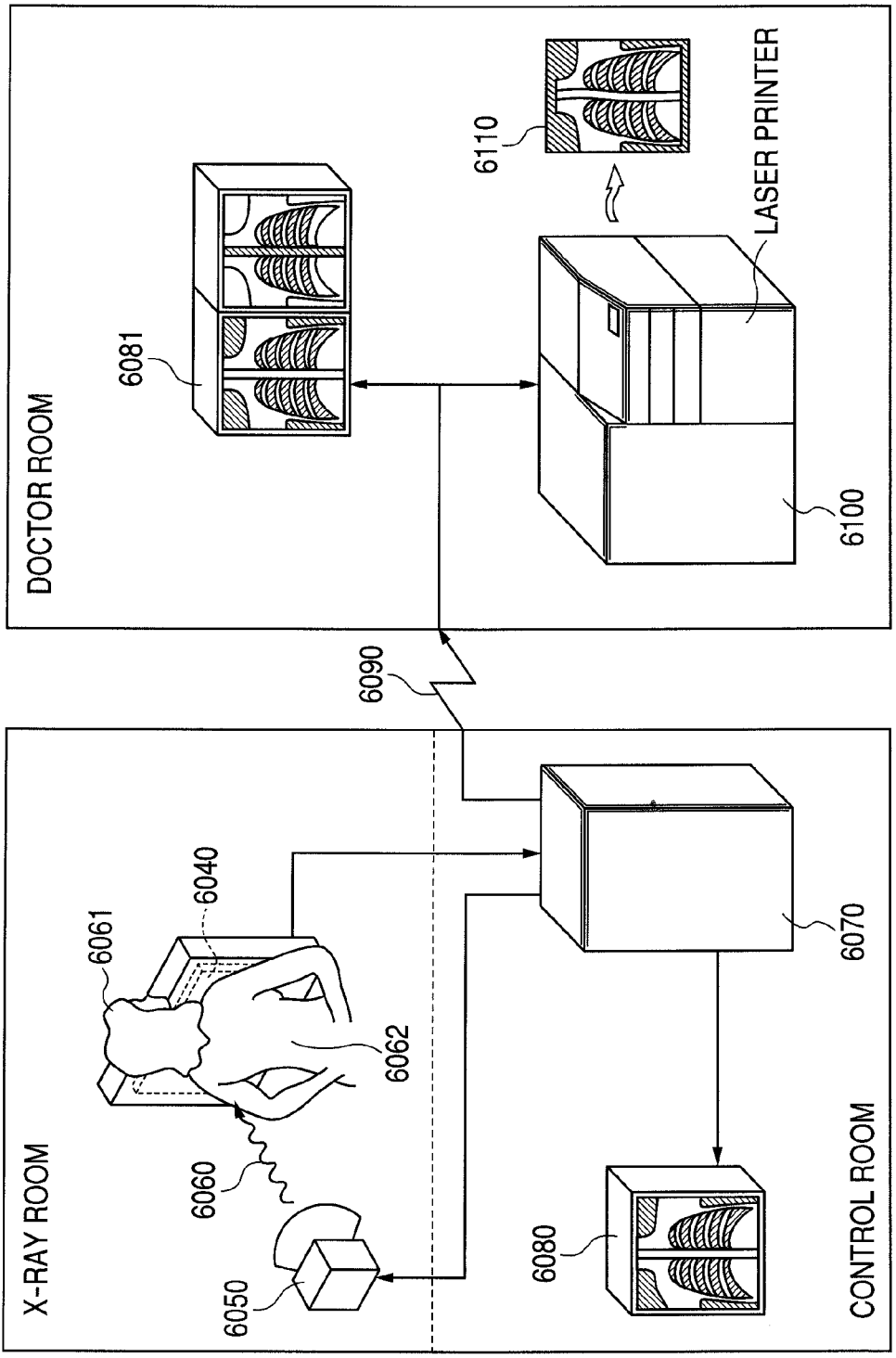
FIG. 8 is a schematic view of an embodiment of a radiation detecting system including a radiation detecting apparatus according to the present invention.

Finally, an embodiment of a radiation detecting system using the above described radiation detecting apparatus of the present invention will be described with reference to FIG. 8.

X-ray 6060 generated by a radiation source 6050 passes through the chest 6062 to be observed of a patient or a human subject 6061, and enters a radiation detecting apparatus 6040 including a sensor panel having a scintillator and a photoelectric conversion element. The entering X-ray includes information on the inside of the body of the human subject 6061. The scintillator emits light in response to the entry of the X-ray, and photoelectrically converts the light to obtain electrical information. The information is converted into digital form, subjected to an image processing by an image processor 6070 as a signal processing unit, and can be observed on a display 6080 as a display unit in a control room.

The information can be transferred to a remote place by a transmission processing unit such as a telephone line 6090, and be displayed on a display 6081 as a display unit in a doctor room in a different place or stored in a recording unit such as an optical disk. This allows diagnosis by a doctor in a remote place. Also, a film processor 6100 as a recording unit can record the information in a film 6110 as a recording medium.

In such a radiation detecting system, when the determining unit 19 in the radiation detecting apparatus determines that the radiation detecting apparatus is in an excessively accelerated state or a free falling state, the communication unit 17 sends a signal to a signal processing unit or a radiation source with or without wires to control so that the radiation source does not emit X-ray. This can prevent emission of the X-ray when there is a problem in the radiation detecting apparatus and increases safety.

INDUSTRIAL APPLICABILITY

As describe above, the present invention can be applied to a medical digital X-ray detecting apparatus, and can be also effectively applied to a digital radiation detecting apparatus for non-destructive inspection or other uses with radiation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-144448, filed Jun. 2, 2008, which is hereby incorporated by reference herein in its entirety.

The invention claimed is:

1. A radiation detecting apparatus comprising:
   a sensor panel for converting radiation or light into an electric charge;
   a casing holding the sensor panel;
   an acceleration detecting unit for detecting an acceleration relating to a movement of the radiation detecting apparatus, and for transmitting a signal based on a value of the acceleration;
   a determining unit for determining, based on the signal transmitted from the acceleration detecting unit, as to whether the radiation detecting apparatus is in a normal state, an excessively accelerated state or a free falling state; and
   a buffer unit, arranged outside of the casing, for operating to absorb a shock exerted on the radiation detecting apparatus, responsive to determination by the determining unit such that the radiation detecting apparatus is in the excessively accelerated state or the free falling state, wherein,
   when the radiation detecting apparatus is connected to another device, the determining unit determines such that the radiation detecting apparatus is in the normal state, and, when the radiation detecting apparatus is not connected to another device, the determining unit determines as to whether or not the radiation detecting apparatus is in the excessively accelerated state or the free falling state.

2. The radiation detecting apparatus according to claim 1, wherein
   the buffer unit is an air bag.

3. The radiation detecting apparatus according to claim 1, wherein
   the buffer unit comprises at least a surface member arranged outside of the casing so that the shock exerts on the surface member firstly at a time of falling; and
   an elastic member arranged between the surface member and the casing.

4. The radiation detecting apparatus according to claim 3, wherein
   the surface member is formed from a material selected from plastic, metal, CFRP, KFRP, and a sheet shaped stretch material of synthetic fiber, and the elastic member is one selected from a shock absorber using an gas or oil pressure, an air bag, a rubber, a coil spring, and a plate spring.

5. The radiation detecting apparatus according to claim 1, wherein
   the buffer unit is placed on at least one or more planes of the casing, and a corner of the casing.

6. A radiation detecting system comprising at least:
   a radiation detecting apparatus according to claim 1;
   a signal processing unit for processing a signal derived from the radiation detecting apparatus; and
   a radiation source generating the radiation.

7. The radiation detecting system according to claim 6, wherein
   responsive to determination by the determining unit such that the radiation detecting apparatus is in the excessively accelerated state or the free falling state, the radiation source is controlled by a transmitting unit provided in the radiation detecting apparatus so as not to generate the radiation.

8. A radiation detecting apparatus comprising:
   a sensor panel for converting radiation or light into an electric charge;
   a casing holding the sensor panel;
   an acceleration detecting unit for detecting an acceleration relating to a movement of the radiation detecting apparatus, and for transmitting a signal based on a value of the acceleration;
   a determining unit for determining, based on the signal transmitted from the acceleration detecting unit, as to whether the radiation detecting apparatus is in a normal state, an excessively accelerated state or a free falling state;
   a buffer unit for operating to absorb a shock exerted on the radiation detecting apparatus, responsive to determination by the determining unit such that the radiation detecting apparatus is in the excessively accelerated state or the free falling state; and
   a restoring unit for restoring the buffer unit that has operated to absorb the shock.

9. The radiation detecting apparatus according to claim 8, wherein
   the buffer unit is an air bag.

10. The radiation detecting apparatus according to claim 8, wherein
    the buffer unit comprises at least a surface member arranged outside of the casing so that the shock exerts on the surface member firstly at a time of falling; and
    an elastic member arranged between the surface member and the casing.

11. The radiation detecting apparatus according to claim 8, wherein
    the surface member is formed from a material selected from plastic, metal, CFRP, KFRP, and a sheet shaped stretch material of synthetic fiber, and the elastic member is one selected from a shock absorber using an gas or oil pressure, an air bag, a rubber, a coil spring, and a plate spring.

12. The radiation detecting apparatus according to claim 8, wherein
    the buffer unit is placed on at least one or more planes of the casing, and a corner of the casing.

13. A radiation detecting system comprising at least:
    a radiation detecting apparatus according to claim 8;
    a signal processing unit for processing a signal derived from the radiation detecting apparatus; and
    a radiation source generating the radiation.

14. The radiation detecting system according to claim 13, wherein
    responsive to determination by the determining unit such that the radiation detecting apparatus is in the excessively accelerated state or the free falling state, the radiation source is controlled by a transmitting unit provided in the radiation detecting apparatus so as not to generate the radiation.

15. A radiation detecting apparatus comprising:
    a sensor panel for converting radiation or light into an electric charge;
    a casing holding the sensor panel;

an acceleration detecting unit for detecting an acceleration relating to a movement of the radiation detecting apparatus, and for transmitting a signal based on a value of the acceleration;

a determining unit for determining, based on the signal transmitted from the acceleration detecting unit, as to whether the radiation detecting apparatus is in a normal state, an excessively accelerated state or a free falling state; and a buffer unit, arranged outside of the casing, for operating to absorb a shock exerted on the radiation detecting apparatus, responsive to determination by the determining unit such that the radiation detecting apparatus is in the excessively accelerated state or the free falling state, wherein the buffer unit includes a surface member, an elastic member arranged between the surface member and the casing, and a fixing unit fixing the elastic member in a contracted state under the normal state and releasing the elastic member from the fixing under the excessively accelerated state or the free falling state.

16. The radiation detecting apparatus according to claim 15, wherein the surface member is formed from a material selected from plastic, metal, CFRP, KFRP, and a sheet shaped stretch material of synthetic fiber, and the elastic member is one selected from a shock absorber using an gas or oil pressure, an air bag, a rubber, a coil spring, and a plate spring.

17. The radiation detecting apparatus according to claim 15, wherein the buffer unit is placed on at least one or more planes of the casing, and a corner of the casing.

18. A radiation detecting system comprising at least:

a radiation detecting apparatus according to claim 15;

a signal processing unit for processing a signal derived from the radiation detecting apparatus; and a radiation source generating the radiation.

19. The radiation detecting system according to claim 18, wherein responsive to determination by the determining unit such that the radiation detecting apparatus is in the excessively accelerated state or the free falling state, the radiation source is controlled by a transmitting unit provided in the radiation detecting apparatus so as not to generate the radiation.

* * * * *